(12) United States Patent
Choi et al.

(10) Patent No.: US 10,897,374 B2
(45) Date of Patent: Jan. 19, 2021

(54) SCALABLE SMART ENVIRONMENT FOR CONTROLLING A PLURALITY OF CONTROLLED APPARATUSES USING A CONNECTION HUB TO ROUTE A PROCESSED SUBSET OF CONTROL DATA RECEIVED FROM A CLOUD COMPUTING RESOURCE TO TERMINAL UNITS

(71) Applicant: Computime, Ltd., Queensway (HK)

(72) Inventors: Hung Bun Choi, Hong Kong (HK); Wai-Leung Ha, Hong Kong (HK); Leung Yin Chan, Hong Kong (HK); Yau Wai Ng, Hong Kong (HK); Chi Chung Liu, Hong Kong (HK); Luke Li, Shenzhen (CN); Tsz Kin Lee, Hong Kong (HK); Chi Lung Chan, Hong Kong (HK); Hamza Yilmaz, Gilroy, CA (US)

(73) Assignee: Computime Ltd., New Territories (HK)

( * ) Notice: Subject to any disclaimer, the term of this patent is extended or adjusted under 35 U.S.C. 154(b) by 175 days.

(21) Appl. No.: 16/037,140

(22) Filed: Jul. 17, 2018

(65) Prior Publication Data

US 2019/0140856 A1    May 9, 2019

Related U.S. Application Data

(60) Provisional application No. 62/581,910, filed on Nov. 6, 2017.

(51) Int. Cl.
*H04L 12/28* (2006.01)
*G05B 19/042* (2006.01)
*G05B 15/02* (2006.01)

(52) U.S. Cl.
CPC .......... *H04L 12/2814* (2013.01); *G05B 15/02* (2013.01); *G05B 19/042* (2013.01); *H04L 12/28* (2013.01); *H04L 12/281* (2013.01); *H04L 12/282* (2013.01); *H04L 12/2809* (2013.01); *H04L 12/2832* (2013.01); *H04L 12/2834* (2013.01); *G05B 2219/2642* (2013.01)

(58) Field of Classification Search
CPC ... H04L 12/2814; H04L 12/28; H04L 12/282; H04L 12/281; H04L 12/2809;
(Continued)

(56) References Cited

U.S. PATENT DOCUMENTS 5,086,385 A * 2/1992 Launey ................. H04L 12/282
                                                    700/83
5,621,662 A * 4/1997 Humphries ............ G05B 15/02
                                                    340/3.1
(Continued)

FOREIGN PATENT DOCUMENTS

CN    104991456 A     10/2015
EM      2784986 A1    10/2014
(Continued)

OTHER PUBLICATIONS

Dec. 25, 2019—(EP) European Search Report—Appl 18204650.8.
(Continued)

*Primary Examiner* — Daniel C. Murray
(74) *Attorney, Agent, or Firm* — Banner & Witcoff, Ltd.

(57) ABSTRACT

Building blocks for a smart device such as a thermostat include a user interface (UI) unit and a terminal (TML) unit. A UI unit may support one or more input data from a user and/or sensors and/or one or more control terminals. The UI unit may process each input datum or a combination of the input data, generate a control signal to one or more control terminals based on the processing, and send the control signal to one or more control terminals over a communication channel. A terminal unit, which may consist of one or more control terminals, transforms the received control signal into one or more controls to one or more associated environmental generators. One or more UI units may control one or more controlled apparatuses in conjunction with a mobile app to allow a unified user experience.

17 Claims, 12 Drawing Sheets

(58) Field of Classification Search
CPC . H04L 12/2834; H04L 12/2832; G05B 15/02; G05B 19/042; G05B 2219/2642
See application file for complete search history.

(56) References Cited

U.S. PATENT DOCUMENTS

| | | | | |
|---|---|---|---|---|
| 6,141,595 | A * | 10/2000 | Gloudeman | G05B 15/02 700/83 |
| 6,434,447 | B1 * | 8/2002 | Shteyn | G06F 3/033 700/245 |
| 6,756,998 | B1 * | 6/2004 | Bilger | H04L 12/2803 715/734 |
| 6,778,868 | B2 * | 8/2004 | Imamura | H04L 12/2825 700/79 |
| 9,222,693 | B2 * | 12/2015 | Gourlay | G05D 23/1905 |
| 9,568,201 | B2 * | 2/2017 | Fadell | F24D 19/1009 |
| 9,960,929 | B2 * | 5/2018 | Fadell | G08B 19/005 |
| 10,057,079 | B2 * | 8/2018 | Lonn | H04L 12/2836 |
| 10,075,828 | B2 * | 9/2018 | Horton | G05B 15/02 |
| 10,120,354 | B1 * | 11/2018 | Rolston | G05B 15/02 |
| 10,133,443 | B2 * | 11/2018 | Von Dehsen | G05B 19/042 |
| 10,142,122 | B1 * | 11/2018 | Hill | H04L 12/2807 |
| 10,168,677 | B2 * | 1/2019 | Funes | H04L 12/2834 |
| 10,263,802 | B2 * | 4/2019 | Burns | H04L 12/4625 |
| 10,397,013 | B1 * | 8/2019 | Hill | H04L 67/306 |
| 10,481,574 | B2 * | 11/2019 | Wiens-Kind | G05B 19/048 |
| 10,508,823 | B2 * | 12/2019 | Guan | G05B 19/042 |
| 10,601,604 | B2 * | 3/2020 | Kozura | H04L 12/2816 |
| 10,678,200 | B2 * | 6/2020 | Matsuoka | F24F 11/62 |
| 10,724,752 | B2 * | 7/2020 | Dyess | F24F 11/62 |
| 10,747,243 | B2 * | 8/2020 | Barton | G05D 23/1902 |
| 2001/0048030 | A1 | 12/2001 | Sharood et al. | |
| 2003/0040812 | A1 * | 2/2003 | Gonzales | G05B 11/01 700/19 |
| 2003/0040813 | A1 * | 2/2003 | Gonzales | H04L 12/2814 700/19 |
| 2003/0074088 | A1 * | 4/2003 | Gonzales | G05B 19/042 700/19 |
| 2004/0260407 | A1 * | 12/2004 | Wimsatt | H04L 12/282 700/19 |
| 2004/0260427 | A1 | 12/2004 | Wimsatt | |
| 2004/0267385 | A1 * | 12/2004 | Lingemann | G05B 15/02 700/83 |
| 2006/0184615 | A1 * | 8/2006 | Park | H04L 12/2803 709/203 |
| 2007/0109975 | A1 * | 5/2007 | Reckamp | H04L 12/2803 370/254 |
| 2007/0143440 | A1 * | 6/2007 | Reckamp | H04L 12/2834 709/217 |
| 2010/0217837 | A1 * | 8/2010 | Ansari | G06F 16/64 709/218 |
| 2013/0218349 | A1 * | 8/2013 | Coogan | G06F 8/34 700/275 |
| 2013/0297042 | A1 * | 11/2013 | Reese | G05B 19/0421 700/3 |
| 2014/0108019 | A1 * | 4/2014 | Ehsani | H04L 12/282 704/275 |
| 2014/0257532 | A1 * | 9/2014 | Kim | G05B 15/02 700/90 |
| 2014/0289387 | A1 * | 9/2014 | Ghosh | H04L 12/2827 709/223 |
| 2014/0379099 | A1 * | 12/2014 | Premereur | H02J 13/0017 700/19 |
| 2015/0074582 | A1 * | 3/2015 | Shearer | H04L 12/282 715/771 |
| 2015/0120596 | A1 * | 4/2015 | Fadell | G06Q 10/0631 705/330 |
| 2015/0156031 | A1 * | 6/2015 | Fadell | G08B 19/005 700/276 |
| 2015/0161515 | A1 * | 6/2015 | Matsuoka | G06F 16/3334 706/17 |
| 2015/0162007 | A1 * | 6/2015 | Hwang | G06F 3/167 704/273 |
| 2015/0276239 | A1 * | 10/2015 | Fadell | F24D 19/1009 237/2 A |
| 2015/0309483 | A1 * | 10/2015 | Lyman | G05B 15/02 700/275 |
| 2015/0309487 | A1 * | 10/2015 | Lyman | H04L 12/2803 700/275 |
| 2015/0347114 | A1 * | 12/2015 | Yoon | H04L 12/2832 235/375 |
| 2015/0349976 | A1 * | 12/2015 | Toutain | G05B 19/042 700/275 |
| 2015/0350031 | A1 * | 12/2015 | Burks | G06F 3/0482 715/736 |
| 2015/0370272 | A1 | 12/2015 | Reddy et al. | |
| 2015/0370615 | A1 * | 12/2015 | Pi-Sunyer | G05D 23/1917 700/276 |
| 2016/0028670 | A1 * | 1/2016 | Lott | H04L 51/14 709/206 |
| 2016/0075016 | A1 * | 3/2016 | Laurent | B25J 13/006 700/47 |
| 2016/0075034 | A1 * | 3/2016 | Laurent | G05B 15/02 700/264 |
| 2016/0091872 | A1 | 3/2016 | Marti et al. | |
| 2016/0091875 | A1 * | 3/2016 | Lloyd | G05B 9/02 700/79 |
| 2016/0132030 | A1 | 5/2016 | Marti et al. | |
| 2016/0132031 | A1 * | 5/2016 | Kozura | H04L 12/2816 700/275 |
| 2016/0139575 | A1 * | 5/2016 | Funes | G05B 15/02 700/275 |
| 2016/0195409 | A1 * | 7/2016 | Goldberg | G01D 4/002 340/870.02 |
| 2016/0195856 | A1 * | 7/2016 | Spero | G05B 15/02 700/90 |
| 2016/0195864 | A1 * | 7/2016 | Kim | H04L 12/2816 709/221 |
| 2016/0197998 | A1 * | 7/2016 | Carleo | H04L 67/12 370/474 |
| 2016/0261425 | A1 * | 9/2016 | Horton | H04L 12/2818 |
| 2016/0308686 | A1 * | 10/2016 | Vijayrao | H04L 51/046 |
| 2016/0364114 | A1 * | 12/2016 | Von Dehsen | H04L 12/2816 |
| 2017/0033942 | A1 * | 2/2017 | Koeninger | H04L 12/2829 |
| 2017/0033944 | A1 * | 2/2017 | Nadathur | G05B 15/02 |
| 2017/0054571 | A1 * | 2/2017 | Kitchen | H04L 12/4625 |
| 2017/0054594 | A1 * | 2/2017 | Decenzo | G08B 25/08 |
| 2017/0070361 | A1 * | 3/2017 | Sundermeyer | H04L 12/2809 |
| 2017/0097619 | A1 * | 4/2017 | Welingkar | G05B 15/02 |
| 2017/0108236 | A1 * | 4/2017 | Guan | F24F 11/30 |
| 2017/0146260 | A1 * | 5/2017 | Ribbich | F24F 11/30 |
| 2017/0148307 | A1 * | 5/2017 | Yeom | G06F 21/316 |
| 2017/0168469 | A1 * | 6/2017 | Marten | H04L 12/2812 |
| 2017/0257257 | A1 * | 9/2017 | Dawes | G06F 16/954 |
| 2017/0321923 | A1 * | 11/2017 | Wiens-Kind | G05B 19/042 |
| 2017/0345283 | A1 * | 11/2017 | Kwon | H04L 12/2816 |
| 2018/0018081 | A1 * | 1/2018 | Dattilo-Green | H04N 7/181 |
| 2018/0019889 | A1 * | 1/2018 | Burns | H04L 12/4625 |
| 2018/0032043 | A1 * | 2/2018 | Matsuoka | G05B 15/02 |
| 2018/0101146 | A1 * | 4/2018 | Hariharan | G05B 13/0265 |
| 2018/0165061 | A1 * | 6/2018 | Nicolich-Henkin | H04L 12/282 |
| 2018/0191720 | A1 * | 7/2018 | Dawes | G06Q 30/0601 |
| 2018/0248972 | A1 * | 8/2018 | Ahuja | H04L 12/2829 |
| 2018/0254959 | A1 * | 9/2018 | Mantyjarvi | G06F 3/04883 |
| 2018/0278434 | A1 * | 9/2018 | Maseng | H04L 12/2814 |
| 2018/0299843 | A1 * | 10/2018 | Ray | H04L 67/125 |
| 2019/0004491 | A1 * | 1/2019 | Wilson | G06F 3/01 |
| 2019/0025782 | A1 * | 1/2019 | Mathews | G05B 15/02 |
| 2019/0088099 | A1 * | 3/2019 | Garg | G06F 3/165 |
| 2019/0158304 | A1 * | 5/2019 | Sundermeyer | H04L 12/2834 |
| 2019/0243352 | A1 * | 8/2019 | Horgan | G05B 23/0235 |
| 2019/0310595 | A1 * | 10/2019 | Martin | G05B 19/041 |
| 2020/0021593 | A1 * | 1/2020 | Pognant | H04L 12/2825 |
| 2020/0064796 | A1 * | 2/2020 | Galvez | G05B 19/042 |
| 2020/0082827 | A1 * | 3/2020 | Lee | G06N 3/084 |
| 2020/0182499 | A1 * | 6/2020 | Xu | F24F 11/30 |
| 2020/0186378 | A1 * | 6/2020 | Six | H04L 12/28 |

(56) References Cited

U.S. PATENT DOCUMENTS

2020/0201271 A1* 6/2020 Xu .......................... F24F 11/65
2020/0224907 A1* 7/2020 Gillette ................... F24F 11/65

FOREIGN PATENT DOCUMENTS

| EP | 3051831 A1 | 8/2016 |
|---|---|---|
| EP | 3149547 A1 | 4/2017 |
| WO | 2014124353 A1 | 8/2014 |
| WO | 2015/184382 A2 | 12/2015 |
| WO | 2017/218176 A1 | 12/2017 |

OTHER PUBLICATIONS

Aug. 27, 2019—(EP) Partial Search Report—Appl 18204650.8.
Nov. 27, 2019—(EP) Extended European Search Report—Appl 18204650.8.
Sep. 18, 2020—(EP) European Search Report—Application No. 20176150.9.
Irvan MHD, Terano Takao: "Distributed Classifier System for Smart Homes Machine Learning", Agent-Based Approached in Economics and Social Complex Systems IX: Post-Proceedings of the AESCS International Workshop 2015, vol. 15, May 3, 2017, pp. 191-197, Springer Singapore DOI: 10.1007/978-981-10-3662-0_15, ISBN: 978-981-10-3662-0.
Sep. 29, 2020—(EP) European Search Report—Application No. 20176120.2.
Peter M. Corcoran, et al: "User Interface Technologies for Home Appliances and Networks", Aug. 1, 1998, vol. 44, No. 3, Aug. 1, 1998, pp. 679-685, XP011008533.
Sep. 18, 2020—(EP) European Search Report—Application No. 20176106.1.

* cited by examiner

SCALABLE SMART ENVIRONMENT FOR CONTROLLING A PLURALITY OF CONTROLLED APPARATUSES USING A CONNECTION HUB TO ROUTE A PROCESSED SUBSET OF CONTROL DATA RECEIVED FROM A CLOUD COMPUTING RESOURCE TO TERMINAL UNITS

This patent application claims priority to U.S. provisional patent application Ser. No. 62/581,910 entitled "A Scalable Smart Environment Using A Gateway Thermostat" filed on Nov. 6, 2017, which is hereby incorporated by reference in its entirety.

TECHNICAL FIELD

Aspects of the disclosure relate to a smart control system. Some embodiments may include a user interface and a terminal unit to control one or more controlled apparatuses.

BACKGROUND OF THE INVENTION

There is frequently a need to support a scalable smart environment that may span environmental controllers, smart devices, and/or other appliances.

SUMMARY OF THE INVENTION

An aspect supports building blocks for a smart device, such as a thermostat. Building blocks include one user interface (UI) unit and one terminal (TML) unit. A UI unit may support one or more input data from a user and/or sensors and/or one or more control terminals. The UI unit may process each input datum or a combination of the input data, generate a control signal to one or more control terminals based on the processing, and send the control signal to one or more control terminals over a communication channel. A terminal unit, which may consist of one or more control terminals, transforms the received control signal into one or more controls to one or more associated environmental generators. Environmental generators (controlled apparatuses) may include furnaces, boilers, air conditioners, heat pumps, fans, de-humidifiers, thermostatic radiator valves (TRVs), and so forth.

With another aspect, a user interface unit communicates to a terminal unit via a communication channel. The communication channel may utilize a wired or wireless transmission medium.

With another aspect, the number of UI and terminal units is flexible. The wired/wireless connections/communications between UI and terminal units are also flexible, to form a scalable smart control system.

With another aspect, a smart control system comprises two individual smart devices. Examples include a thermostat (having one UI unit and one terminal unit) and a home console (having one UI unit and multiple terminal units including those for lightings, switches, TV's, air conditioners, and so forth).

With another aspect, one or more UI units may communicate with one or more terminal units via a connection hub. Control commands and status reports may be collected in the connection hub and may be routed to target devices within the web. The connection hub may be implemented in a public cloud provided by a service provider or within one of the many UI units within the smart control system.

With another aspect, a UI unit may be a gateway which connects all other smart devices to a public cloud.

With another aspect, a UI unit may support a private cloud, where controls and status reports are manipulated within the user's home network before going to a public domain. The UI unit further supports a rule engine for smart devices within a home environment and only user-defined control and information are sent to public cloud for further manipulation. The UI unit may be equipped with the capabilities of a connection hub, a gateway and private cloud.

With another aspect, different UI units may have different user interface capabilities such as an LCD with touchscreen, 7-segment LEDs with mechanical buttons, and so forth.

With another aspect, there is no UI unit at all and the control of terminal units is done via mobile devices, such as a smart phone or a tablet.

With another aspect, a terminal unit may support one or more control terminals for heating units, cooling units, heat pumps, fans, de-humidification, and the like.

With another aspect, the terminal units may be extended to include those for controlling different electrical appliances. Flexibility may be supported for interactions between different electrical appliances and different UI units. The electrical appliances can be, but not limit to, smart home devices (such as thermostats, light bulbs, smart sensors, smart plugs, and so forth), home appliances (such as air conditioners, washing machines, electric grill, oven, and so forth), a game console, media devices, healthcare devices, and the like.

With another aspect, a mobile application is scalable such that it can select all the smart devices which connect to a UI unit (which has the capabilities of user interface, gateway, connection hub and private cloud). Conversely, it may de-select a smart device from the list.

With another aspect, the user experience design (UX) and UI graphic of each UI unit in the mobile app is identical to the actual UX and UI graphic of the pair to improve user experience. No extra learning for using the mobile app is thus needed.

With another aspect, a rule engine may execute on a terminal unit, and/or a UI unit, and/or public cloud.

With another aspect, a UI unit may comprise a mobile app that controls all the associated terminal units via either WiFi or BLUETOOTH® Low Energy (BLE). In this case, a rule engine may be downloaded to individual terminal units to reduce the latency caused by network performance or when the network connection is unavailable or when the mobile phone is absent. More complex rule engines and learning algorithms may be implemented in the mobile phone or public cloud.

With another aspect, a number of UI and terminal units may also be connected and one of the UI units which may have enough computational and memory power to implement the functions of a connection hub, a gateway and a private cloud which has a rule engine with a learning algorithm to execute.

With another aspect, an individual terminal unit may have its own UI unit. A rule engine and learning algorithm may be implemented separately into each UI/terminal pair and the associated input/output devices to form a local loop. Status reports for each UI/terminal pair may be sent to a public cloud via one UI/terminal pair. Rule engine and learning algorithms for the interactions between of all the UI/terminal pairs may be implemented in the public cloud.

With another aspect, a number of local loops can be grouped together to form a network, such as a home network, a building network, a community network, a regional network, etc.

With another aspect, rule engines and learning algorithms may be implemented with four different levels. First, a simple rule engine may be implemented in the terminal unit based on its individual internal inputs (for example, sensor inputs) and associated external inputs (for example, external sensor inputs). The rule engine may be downloaded to the terminal unit using WiFi or BLE in the mobile phone. Second, a rule engine may be implemented within individual UI unit which controls one or more terminal units. Third, a rule engine between different UI/terminal pairs may be implemented in the private cloud (which may be one of the UI/terminal pairs). Learning algorithms may be implemented in the private cloud to reduce the latency introduce by the internet. Fourth, a rule engine and learning algorithm may involve external Things of Interest (for example, weather information, location data, sales information, and the like) that may be implemented in a public cloud.

With another aspect, rules may be automatically generated via machine learning algorithm. Machine learning may be applied locally in the UI unit of a local loop. Machine learning can also applied to the information received from multiple UI units of a larger network. Machine learning may be conducted within a single UI unit which has better system hardware. Learning may also be distributed to different UI units to reduce the computation loading for individual UI unit and summarized within the primarily UI units.

With another aspect, the configuration of each UI/terminal pair may be set in the mobile app and committed to an individual UI/terminal pair one after another by using near-field communications (NFC). Alternatively, a user can commit to the private cloud (which may be one of the UI/terminal pairs) via NFC and the private cloud can then route the configuration to an individual UI/terminal pair.

With another aspect, system security may be realized via audio signature when audio service is available in the private cloud or individual UI/terminal pair. A user may use voice commands to unlock the system. Alternatively, the NFC of the user's mobile device may also be used, assuming that only the user can unlock his/her mobile device. Voice signature or NFC access may also be used for system personalization to configure the system based on the individual user's historical data to meet his/her preference system behavior(s).

With another aspect, a scalable smart control system controls at least one controlled apparatus, where the control flow and the user interface graphics of a UI unit in a mobile app are identical to that in a physical UI unit. The status of each UI unit in the dash board of the mobile app is identical to the current status as shown in the physical UI unit. A user may choose a UI unit from the dash board of the mobile app for further manipulation, as it is done on the spot. This eliminates the learning needs in using the mobile app and allows a unified user experience in using the UI unit as well as the mobile app.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

Figure 1:
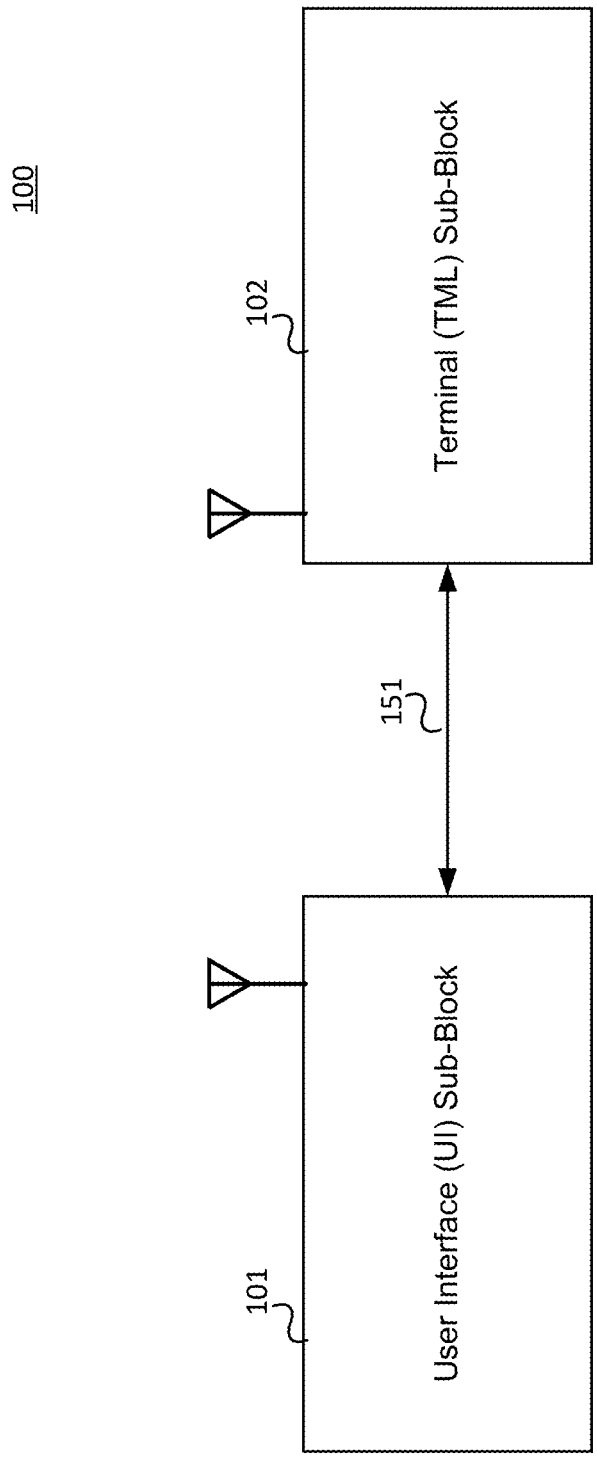
FIG. 1 shows system building blocks of a gateway thermostat in accordance with an embodiment.

It will be apparent to one skilled in the art after review of the entirety disclosed that the steps illustrated in the figures listed above may be performed in other than the recited order, and that one or more steps illustrated in these figures may be optional.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Illustrative embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (for example, a system, computer executable product, and/or other device), a method, or a combination of the foregoing. Accordingly, embodiments of the present invention may take the form of an entirely hardware embodiment, an entirely software embodiment (including firmware, resident software, micro-code), or an embodiment combining software and hardware aspects that may generally be referred to herein as a "system." In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media. Embodiments of the present invention are described below with reference to flowchart illustrations and/or block diagrams of processes or apparatuses (the term "apparatus" including systems and computer executable products). It will be understood that each block of the flowchart illustrations and/or block diagrams, and combinations of blocks in the flowchart illustrations and/or block diagrams, can be implemented by computer executable instructions. These computer executable instructions may be provided to a processor of a special purpose computer or other executable data processing apparatus to produce a particular machine, such that the instructions, which execute by the processor of the computer or other executable data processing apparatus, create mechanisms for implementing the functions/acts specified in the flowchart and/or block diagram block or blocks.

These computer executable instructions and algorithms described herein may also be stored in a computer-readable memory that can direct a computer or other executable data processing apparatus to function in a particular manner, such that the instructions stored in the computer readable memory produce an article of manufacture including instructions, which implement the function/act specified in the flowchart and/or block diagram block or blocks.

FIG. 1 shows system building blocks 101 and 102 of gateway thermostat 100 in accordance with an embodiment.

System 100 includes terminal unit 102 and user interface (UI) unit 101. Each unit may be housed separately and connected via either wireless means or wired means 151.

A wireless connection may support Sub-1G, ZWave, WiSun, Zigbee, Thread, BLE, WiFi, NFC, 2G/3G/4G modem or IrDa or any combination of these wireless technologies.

A wired connection may support a direct connection of the system control signals. It may also support any wired interface, such as SPI, I2C, UART, USB, CAN, Ethernet, Opentherm, RS232/RS485 running FSK, eBus, EMS, MP Bus, Modbus, BACnet, and the like.

A proprietary protocol may be defined for exchanging system information as well as terminal controls.

System flexibility for multiple connection scenarios may be enabled by using the design topology shown in FIG. 1.

Figure 2:
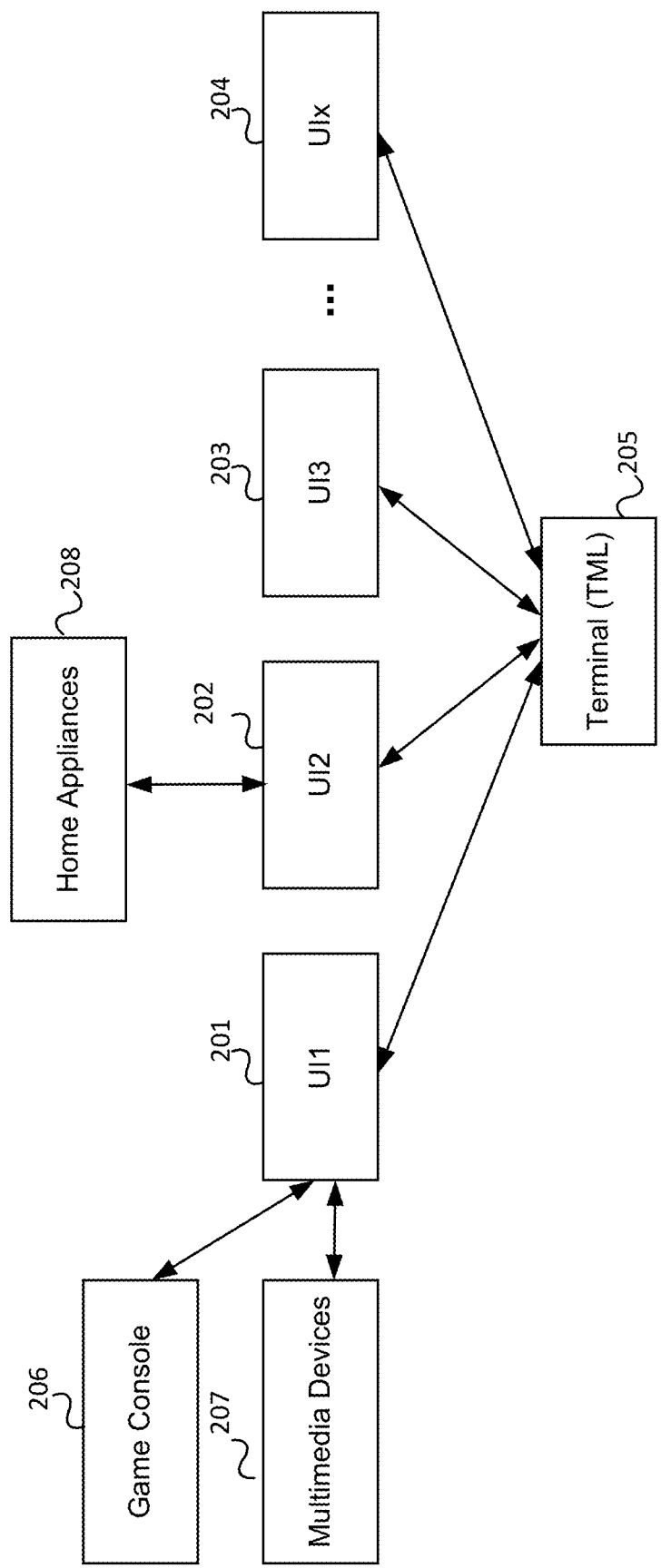
FIG. 2 shows multiple user interfaces (UI) units controlling a single terminal unit in accordance with an embodiment.

FIG. 2 shows multiple user interfaces (UI's) 201-204 controlling single terminal unit 205 in accordance with an embodiment.

Multiple UI units 201-204 may be able to control single terminal unit 205. The feature requirements for different UIs may be different. With one embodiment, UI unit 201 (for example, located in the sitting room) may be a comprehensive UI unit that is configured to control other appliances, such as a TV (not explicitly shown), game console 206, and/or multimedia console 207. UI unit 202 may be the control panel of a home appliance 208, such as an oven.

Figure 3:
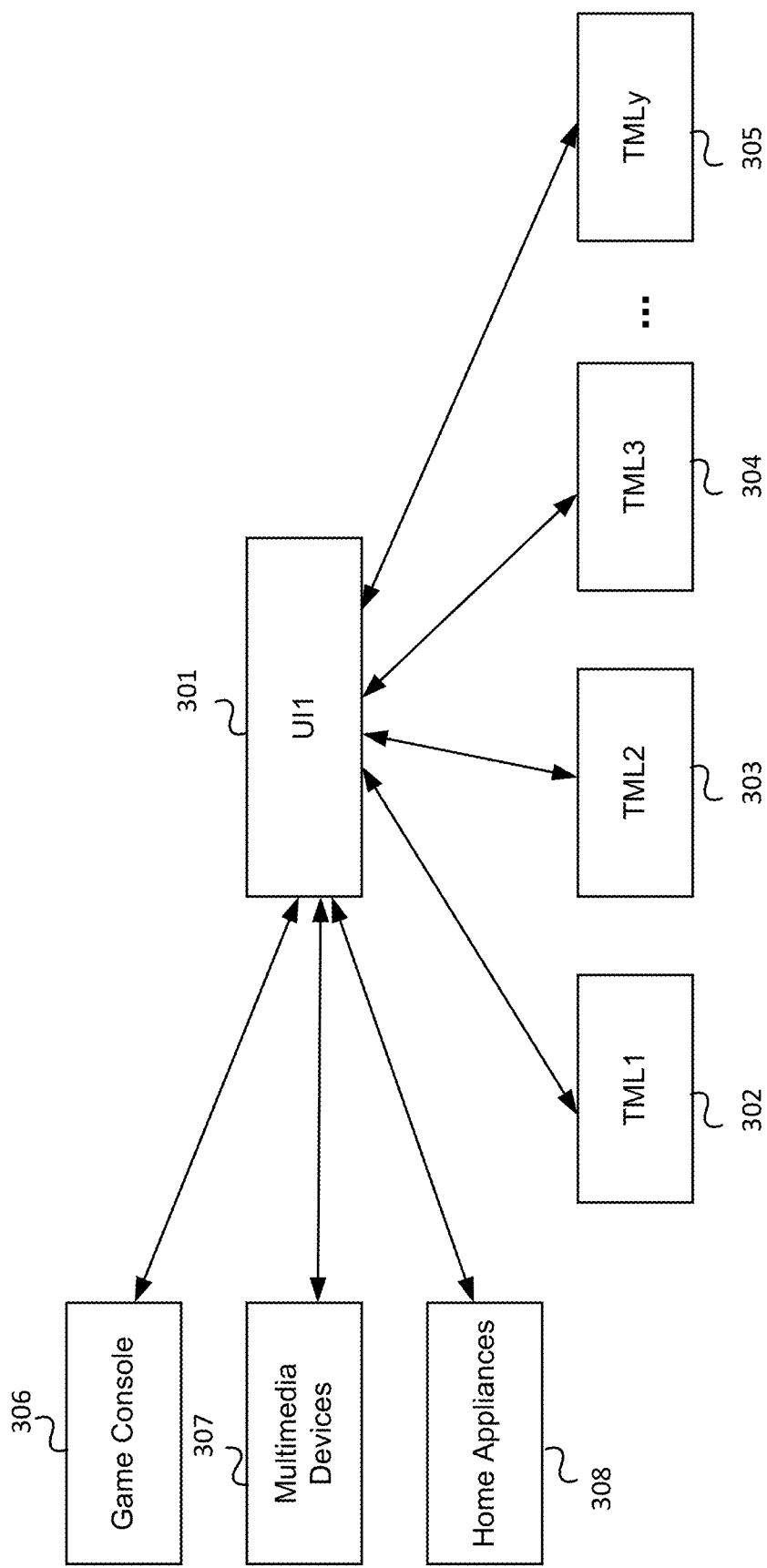
FIG. 3 shows a single UI unit controlling multiple terminal units in accordance with an embodiment.

FIG. 3 shows single UI 301 controlling multiple terminal units 302-305 in accordance with an embodiment.

Single UI unit 301 is able to control a range of terminal units 302-305. The feature requirements for different terminal units 302-305 may be different. For example, UI unit 301 may control a first terminal unit at home (which may have three-stages of heat and cool, a heat pump, a fan and a de-humidifier) and a second terminal unit in an individual store room away from home (which may only have one-stage heat and cool, a heat pump, and a fan).

The following is an example illustrating the operation between UI unit 301 and a terminal unit 302. A user sets a target temperature to UI unit 301. UI unit 301 then sends the target temperature to terminal unit 302. Terminal unit 302 may act as a thermostat or may control an external thermostat (not explicitly shown). Using its rule engine to estimate how long it will take to reach the target temperature, terminal unit 302 decides when to use different stages of a heating and cooling system (not explicitly shown). If a first stage of heating/cooling cannot reach the desired temperature in a reasonable amount of time, terminal unit 302 may activate additional stages of heating or cooling to ensure achieving the target temperature.

The following is another example illustrating the operation between UI unit 301 and a terminal unit 302. A user is on the way back home and performs the following actions via a smart home app executing on his/her mobile device.

Sets the target temperatures of his/her sitting room and executes the setting.

Sets the target time and temperatures of his/her bed room as well as his/her children's rooms.

Programs the washing machine

Sets the time and temperature of the oven

When the user arrives home, the user puts all the dirty clothes into the washing machine and a turkey into the oven. Referring to FIG. 3, the user then puts the near field communications (NFC) device of his/her mobile device near central UI unit 301 in the sitting room (which also functions as the connection hub of his home). Central UI unit 301 then routes the settings to the corresponding terminal units 302-305 within the local loop, including the HVAC terminal units for the bed rooms, the terminal unit of the washing machine, and the terminal unit of the oven.

Figure 4:
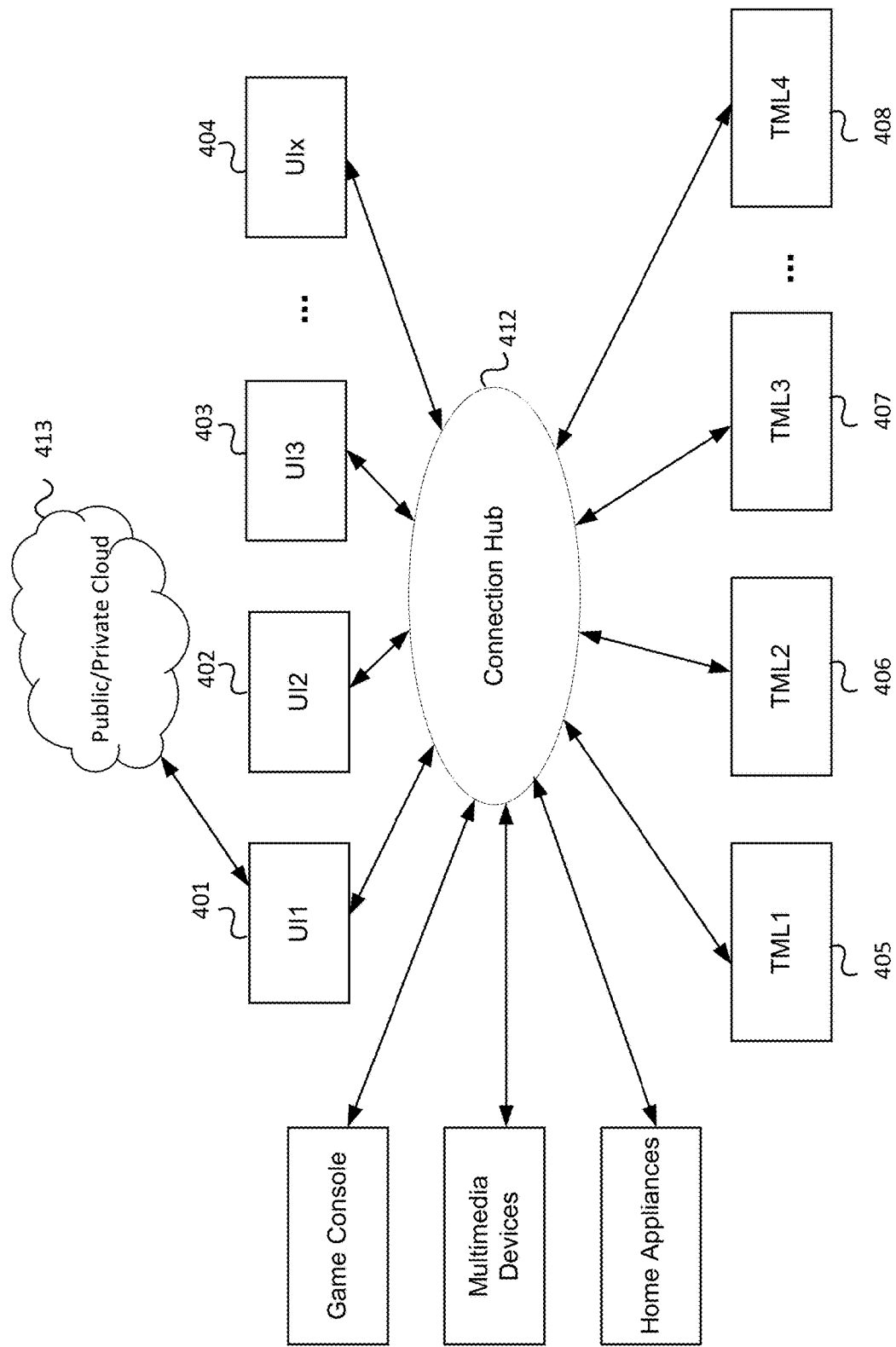
FIG. 4 shows a connection hub between multiple UI units and terminal units in accordance with an embodiment.

FIG. 4 shows a connection hub between multiple UI units 401-404 and terminal units 405-408 in accordance with an embodiment.

With some embodiments, multiple UI units 401-404 and terminal units 405-408 are connected together via connection hub 412. Control commands and status reports are collected in connection hub 412 and may be routed to target devices within the web. Connection hub 412 may be implemented in a public/private cloud 413 provided by a service provider or within one of the UI units 401-404.

In the embodiments shown in FIGS. 2-4, the UI unit can be a gateway which connects all other devices to a public cloud. Alternatively, the UI unit may be a connection hub which routes the commands and status reports to target devices within the web. Alternatively, the UI unit may be a private cloud, in which all the controls and status report may be manipulated within the user's home network before going to a public domain. Embodiments may include a rule engine (for example mapping events to actions) for all the smart devices within a home network and only the user-defined control and information are sent to public cloud for further manipulation. The UI unit may also be equipped with capabilities of a gateway, a connection hub and private cloud.

Figure 5:
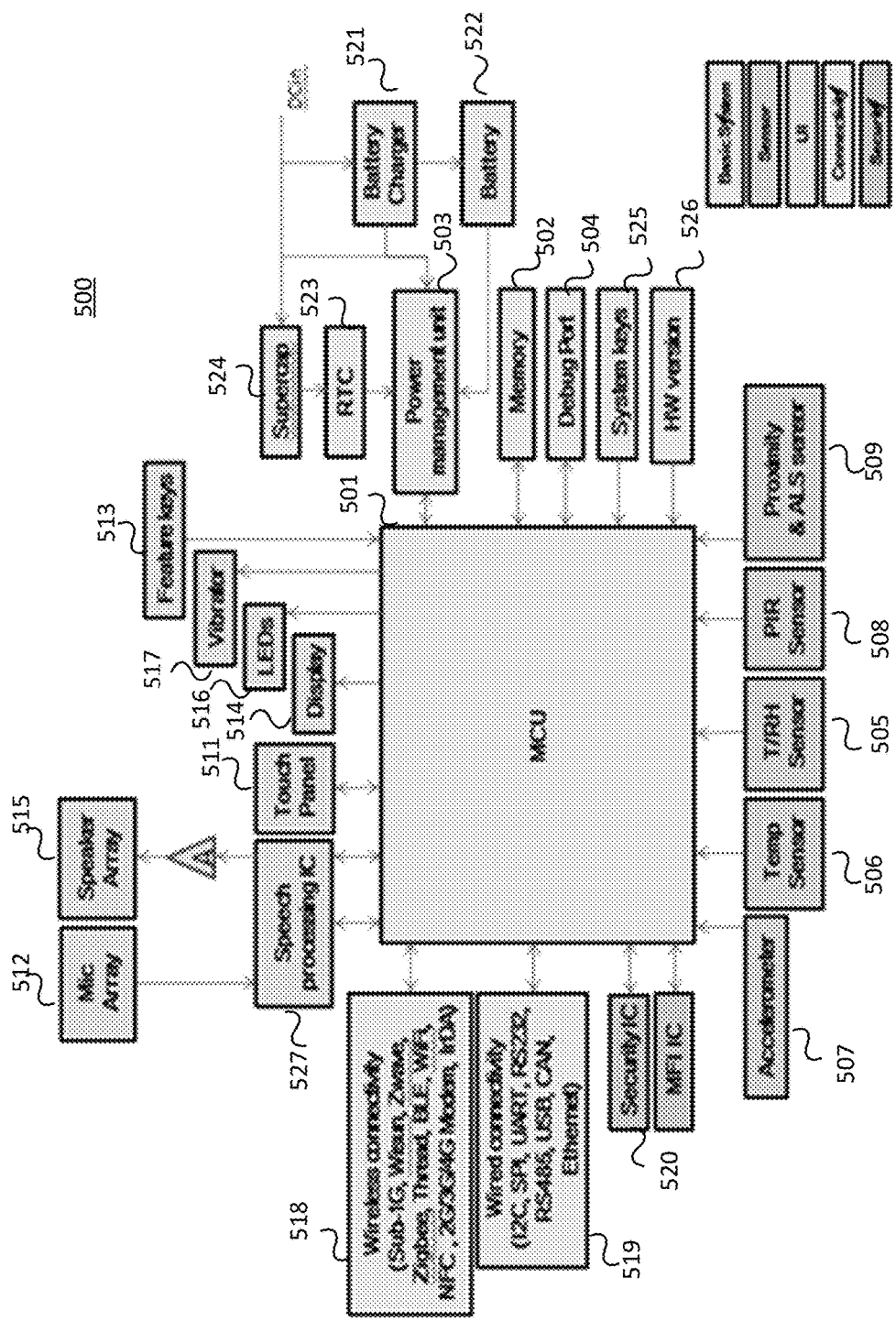
FIG. 5 shows a user interface unit in accordance with an embodiment.

FIG. 5 shows a user interface (UI) unit 500 in accordance with an embodiment. Components of UI unit 500 comprise a basic subsystem, a sensor subsystem, a UI subsystem, a connectivity subsystem, and a security subsystem.

The basic subsystem includes main processor 501, memory device 502, power management unit 503, and other system components as will be discussed.

Main processor 501 may be a MCU, a SoC of a single processor core, or a multi-core SoC with numerous co-processor or accelerators. Multiple processors may also be used depending on the system architecture design.

Different combination of memory device(s) 502 may be used (such as SSD, eMMC, NAND, NOR, DDR3, SDRAM, EEPROM) depending on the feature requirements. If a private cloud is implemented into a UI unit, a large size eMMC or an SSD may be used for data warehousing and data mining as well as machine learning.

The core building block of the power management unit (PMU) 503 may be discrete components or a complex power management IC (PMIC) which may include multiple DC-DC converts, LDOs as well as battery charging circuitry 521 and/or external battery 522. Some embodiments may require separate real-time clock (RTC) 523 with backup power source (a re-charge coil cell battery or a super-cap 524), in order to provide an accurate clock source when system 500 in deep sleep mode.

Other basic system components may include debug port(s) 504 for system debugging, keys 525 for resetting system 500 and configuring different system boot modes, and information apparatus 526 that is indicative of the hardware version and the like.

A sensor subsystem may include multiple sensors to enable a "smart environment". The sensors include, but not limit to the following:

Temperature and relative humidity sensor (T/RH) 505: A combo temperature (T) and relative humidity (RH) sensor may be used to monitor the ambient temperature and relative humidity.

Temperature sensor(s): Multiple temperature sensors (Temp) 506 may be installed for measuring the ambient temperature as well as the internal temperature of the UI unit for temperature compensation.

Accelerometer: Accelerometer 507 may be installed to detect the orientation of the UI unit and to use the corresponding UI/UX. Accelerometer 507 may also be used as user inputs, through different tapping patterns and directions.

PIR sensor: Passive infrared (PIR) sensor 508 may be installed to detect the presence of human object(s) within the area of interests. One of the applications is directed to energy saving, in which some appliances may only be operated when human object(s) are detected. For example the backlight of a UI unit may be turned on when a human object is detected.

Proximity sensor: Proximity sensor 509 may be equipped to detect the proximity of a human object. In such case, the UI unit may prepare all the essence information for device operation, for example prompting up the setting page for temperature and operation mode when an object is detected within a pre-defined distance.

Ambient light sensor: An ambient light sensor (not explicitly shown) may be equipped for backlight adjustment according to ambient light intensity for user experience enhancement.

The UI unit can also receive inputs from external sensor through wired or wireless means.

Inputs from combination of sensors can be used together to provide means to enhance user experience in the smart environment.

As will be discussed, the user interface subsystem may support inputs from touch panel 511, microphone array 512, and feature keys 513 as well as support outputs to display 514, speaker array 515, LED(s) 516, and vibrator 517. Other user inputs and outputs means may also be added to enhance the user experience of the smart environment.

Display and capacitive touch panel 511 may include traditional UI means.

Depending on the application requirement, a display may be segment LEDs, or a segment TN LCD, or a PMOLED LCD, or a dot-matrix TN LCD, or a color TFT LCD, or an IPS TFT LCD, or an AMOLED LCD.

For touch panels, resistive touch or capacitive touch may be supported. Gesture inputs as well as multiple touch inputs may also be supported.

Regarding speaker array 515 and microphone array 512, audio UI means may also be used to provide a more natural user experience. Microphone array 512 together with audio processing algorithms (supported by device 527) may be used to provide a clear voice command understand noisy environment. The speech recognition algorithm may be deployed to understand the commands. Speaker array 515 may be used to provide a voice feedback.

Microphone array 512 may be used to detect the position of a user and hence the voice feedback can be focused towards the user's position when a more complex speaker array is used.

Other system inputs include the count and direction of taps from accelerometers 507, feature keys 513, and the like.

Other system outputs include system LEDs 516 and vibrator 517. System outputs may incorporate a combination of different LED colors, mark space ratios of the LED's, vibration patterns, and so forth.

The connectivity subsystem includes wireless connectivity and wired connectivity.

Wireless connectivity subsystem, 518 depending on the application requirements, may be a combination of Sub-1G, Wisun, Zwave, Zigbee, Thread, BLE, WiFi, NFC, 2G/3G/4G modem or IrDa, and so forth.

Wired connectivity subsystem 519 may be a combination of I2C, SPI, UART, RS232, RS485, USB, CAN, Ethernet, Opentherm, and so forth.

Security subsystem 520 may be included to avoid unauthorized system access and to protect user identity and data from the smart devices. This may be important for IoT application, where data of smart devices are uploaded to the public cloud for data mining and machine learning of user behavior.

General system access can be done through password input.

Voice signature may also be used to prevent un-authorized system access, verification of user identity and hence to enable personalized system profile.

Encryption may be applied when data is exchanged between a UI unit and public cloud. Data encryption may be done by SW implementation. Alternatively, an external data encryption IC (not explicitly shown) can be used to further strengthen data security.

Figure 6:
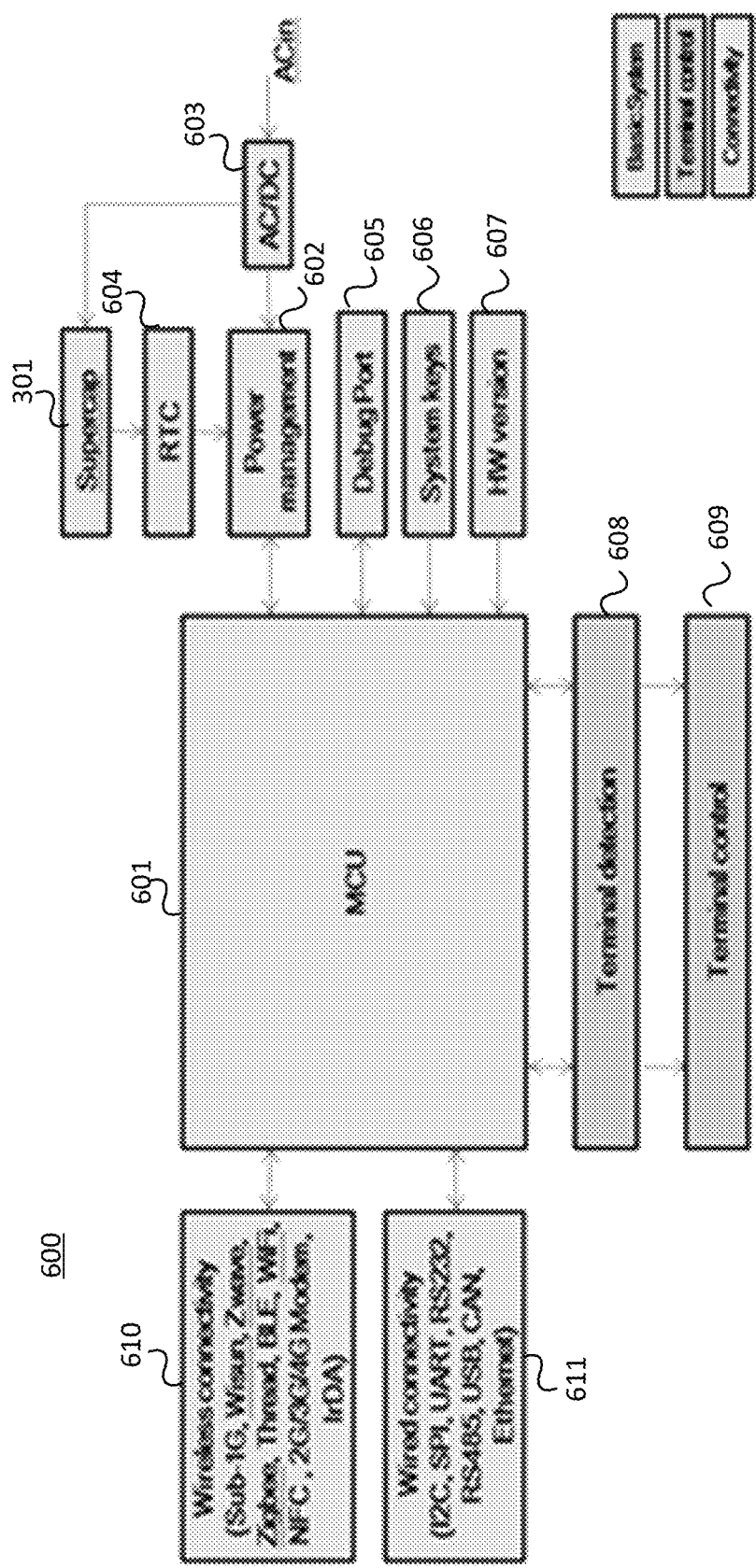
FIG. 6 shows a terminal unit in accordance with an embodiment.

FIG. 6 shows terminal unit 600 in accordance with an embodiment.

The building blocks of terminal unit 600 include a basic subsystem, a connectivity subsystem, and a terminal control subsystem.

Similar to the UI unit, the basic subsystem of terminal unit 600 may include main processor 601, its corresponding memory devices (not explicitly shown), power management unit 602, and other system components.

Main processor 601 may be a MCU with limited memory that is powerful enough to detect and control its associated terminals as well as communicating to its associated devices, including smart sensor(s) and/or UI unit(s).

Power management unit (PMU) 602 may be implemented with discrete components, including AC/DC converter, DC/DC converters and LDOs.

RTC 604 may be used to provide the clock when terminal unit 600 is in deep sleep mode and no RTC is available from the UI unit(s).

Other basic system components include debug port(s) 605 for system debugging, keys 606 for resetting system 600 and configuring different system boot modes, information apparatus 607 for storing information indicative of the hardware version and so forth.

The terminal control subsystem includes terminal detection and control.

Detection circuit 608 is implemented to detect if an appliance is connected to a terminal and/or if the appliance is disconnected (malfunction) during operation.

Terminal control (ON/OFF) 609 is enabled when an appliance is detected.

The connectivity subsystem includes wireless connectivity and/or wired connectivity, depending on the application requirements.

Wireless connectivity subsystem 610 may support a unique protocol which may be sub-1G, Wisun, Zwave, Zigbee, Thread, BLE, WiFi, NFC, 2G/3G/4G modem or IrDa, and the like.

Wired connectivity subsystem 611 may include an I2C, SPI, UART, RS232, RS485, USB, CAN, Ethernet, Opentherm interfaces. Wired protocol(s) may be implemented using the connection, such as Modbus, BACnet, EBus, EMS Bus, MP Bus, FSK or a proprietary protocol. Direct connection of the control signal may be allowed if UI unit 500 and terminal unit 600 are at the same location.

With reference to FIGS. 5 and 6, the computing system environment may include a computing device wherein the processes discussed herein may be implemented. The computing device may have a processor for controlling overall operation of the computing device and its associated components, including RAM, ROM, communications module, and memory device. The computing device typically includes a variety of computer readable media. Computer readable media may be any available media that may be accessed by computing device and include both volatile and nonvolatile media, removable and non-removable media. By way of example, and not limitation, computer readable media may comprise a combination of computer storage media and communication media.

Computer storage media may include volatile and nonvolatile, removable and non-removable media implemented in any method or technology for storage of information such as computer readable instructions, data structures, program modules or other data. A program module may include computer-executable instructions that are executed by one or more processors. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computing device.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The following capabilities may be supported by the embodiments:

A thermostat system which consists of two separate sub-blocks for system flexibility.

The first sub-block is for terminal control, the terminal unit. The number of control terminals and their functions are configurable according to the product requirements.

The second sub-block is for user interface (UI), the UI unit. The complexity of the UI unit may be changed according to the product requirements, the complexity of user experience and the graphics. Examples include portrait or landscape detection, voice control and feedback, user identification, human presence detection, user proximity detection, ambient light tracking, fun lighting, haptic feedback, 2D/3D animations, and so forth.

The communication means between the two sub-blocks may depend on the user cases, including:
   a. Directly connecting the control signals through connectors when the two sub-blocks are located at the same spot.
   b. Wireless communication when the two units are separated apart from each other.
   c. Wired communication scenario where wireless communication is not feasible.

Embodiments may utilize the thermostat design topology shown in FIG. 1.
   a. A UI unit is able to control a single terminal unit r multiple terminal units.
   b. A terminal unit may be controlled by a single UI unit or multiple UI units.
   c. Multiple UI units and terminal units may be connected together through a connection hub.

A thermostat system may be extended to include different smart devices. Moreover, flexibility is allowed for different terminal units to be associated with different UI units, for interactions. The smart devices may be, but not limit to, smart home devices (e.g. thermostats, light bulbs, smart sensors, smart plugs, etc.), home appliances, a game console, media devices, healthcare devices, and so forth.

The terminal unit implements only one or numerous control terminal. Examples include:
   a. A comprehensive set of control terminals including heats, cools, heat pumps, fans, fan speeds, de-humidifier, auxiliary, and so forth.
   b. A single control terminal for boiler on/off.
   c. A single control terminal to produce a pulse width modulation output, such as those used for motor control or heating elements.

The UI unit is equipped with gateway capability to connect the terminal unit and other smart devices to public cloud.

The UI unit is also equipped with private cloud capability, including but not limited to:
   a. Data warehouse to record the history of the terminal unit and other smart devices.
   b. A rule engine which implements all the rules for the interaction between the terminal unit and other smart devices.

As an example, a user sets a target temperature to warm up a room. The rule engine may set a first stage algorithm to control a terminal unit or more terminal units to reach the target temperature in a reasonable time. The first stage algorithm may be obtained from a user's input or predefined heuristic algorithm or may be generated by artificial intelligence (AI) of the rule engine based on collecting data from the environment. The terminal unit(s) may feedback temperature(s) to the rule engine. If the target temperature is not achieved in a reasonable time, the rule engine may control terminal(s) with a second stage algorithm or even a third stage algorithm in order to achieve the target temperature and thus ensure comfort to the user.

As another example, a user always turns on the thermostats of the bed rooms and turns off the thermostat of the sitting room, the oven, the microwave and cooker in the kitchen. All of these actions may be captured by the UI units in the corresponding smart device and sent to the central UI unit. The central UI unit learns the user profile. One day, the user goes to bed and forgets to turn off the oven. The central UI unit automatically sends a turn off command to the UI unit of the oven and then sends a warning to the user.

c. A learning model to learn and adapt to the user behavior in using the terminal unit and other smart devices.

The wireless connectivity subsystem of the UI unit supports, but is not limited to, WiFi, BLE, Zigbee, ZWave, and NFC.
  a. The WiFi subsystem enables internet access to the UI unit and other smart devices connected to it. The WiFi subsystem also allows mobile app control via WiFi direct.
  b. The Zigbee subsystem, ZWave subsystem and BLE subsystem connect to the smart devices under the same protocols, for example, Zigbee thermostat, smart plugs and light bulbs, ZWave thermostats and sensors, BLE heartbeat monitor and weight scale, and so forth.
  c. The BLE subsystem also enables directly control of smart devices through mobile app.
  d. The NFC subsystem provides a direct and easy way for UI units to pair with terminal units and/or transfer the profiles to the UI units, thereafter routing to the target UI units and/or terminal units.

the wired connectivity subsystem of the UI unit consists of, but not limited to, an Ethernet and an RS485 connections.

The Ethernet connects UI unit directly to internee.
  b. The RS485 allows wired protocol to be implemented for controlling the smart devices which only have wired connectivity available, for example Modbus or BACnet.

The UI unit equips with an accelerometer for portrait or landscapes UI mode. Moreover, it allows user inputs by tapping the UI unit from different directions with different count of tabs.

The audio subsystem of the UI unit consists of a mic array with two digital microphones and a speaker array with two speakers.
  a. The audio subsystem is used for user identification, speech recognition, audio feedback as well as audio playback.
  b. User identification is used for access control to the UI unit.
  c. User identification is also used for retrieving personal profile for automatic control of all the smart devices as well as learning of user behavior.
  d. Speech recognition is used for controlling the smart devices. During the speech recognition process, the direction of the user is also estimated.
  e. The audio feedback can be focused towards the direction of the user estimated.

The UI unit has a large memory to store the data from a range of connected smart devices. A rule engine may be implemented to enable the interaction between smart devices. The interactive rules may be set by users through the UI unit or via a mobile device. Alternatively, it may be learnt directly via a learning algorithm implemented within the UI unit(s), private cloud or public cloud.

A learning implemented to enable learning of user behavior.
  a. Supervised learning is started by using the rule engine to understand the "Things of Interests" (TOI).
  b. The model learns the user behavior through the data the smart devices and associated user inputs.
  c. The model repeats the user behavior when a predefined confide reached.
  d. Reinforce learning is implemented when user correction is made to the machine action.
  e. Machine learning may be conducted in the public cloud server or private cloud server (which reside within a UI unit) or distributed amongst the number of UI units within a network.

A simple rule engine is also implemented in the terminal unit, when a UI unit or network connection is not available, which take the inputs from associated smart devices to execute the controls. An example would be the terminal control would be enabled when user presence is confirmed from an external PIR sensor.

Rules related to the terminal unit are downloaded to the terminal unit when it is established and executed accordingly within the terminal unit.

A mobile application clones the user interface of the UI unit. The usage model is such that a user is using the UI unit on the spot. For example, when a user uses a mobile app to control a smart device, the UI unit and the control flow of the mobile app cooperate together. An advantage of this approach is a unique user experience in using the smart device and its associated mobile app so that a user does not have to learn two user interface schemes for a single smart device (one in the UI unit and the one in the mobile app).

The mobile application is scalable such that it can select all the smart devices which connected to the UI unit. Conversely, it can de-select a smart device from the list.

Figure 7:
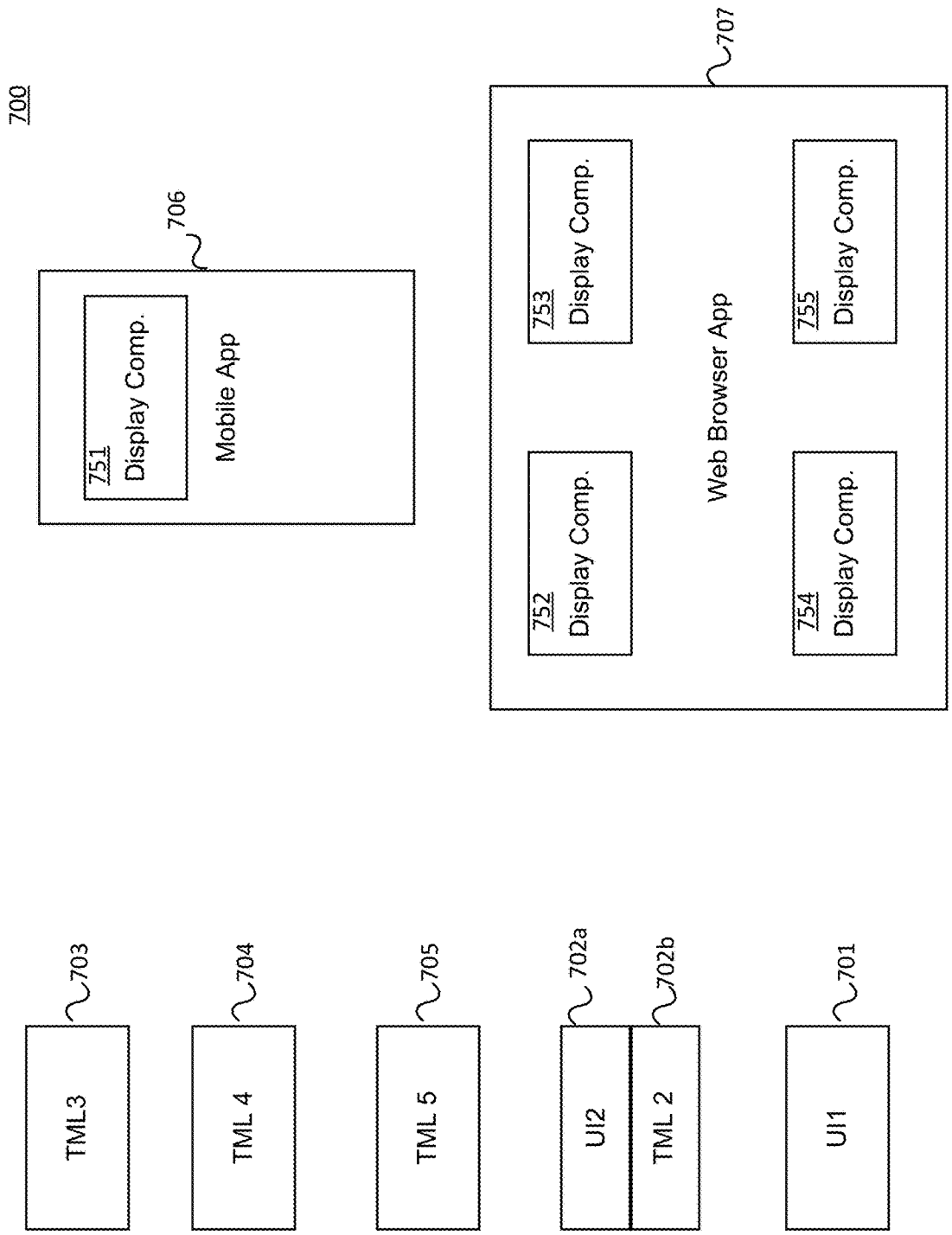
FIG. 7 shows a system with multiple UI units, multiple terminal units, a mobile app, and a web browser app in accordance with an embodiment.

Referring to the embodiment shown in FIG. 7, system 700 includes 2 UI units 701 and 702a, 4 TML units 702b, 703, 704, and 705, mobile app 706, and PC web browser app 707. While not explicitly shown, some of the elements may interact with each other via wired or wireless communication channels. UI1 701 comprises a home console that supports a home gateway, a rule engine, and a connection hub. Device control from UI1 701 may be performed via a capacitve touch panel and/or voice commands. UI2/TML2 pair 702a,702b supports a thermostat in which UI unit 702a and terminal unit 702b are wiredly connected via a proprietary control protocol. TML3 703 may be a simple terminal unit which controls a relay of a heating element. TML4 704 and TML5 705 may be terminal units controlling the LED lighting at different zones. There was no dedicated UI for TML3 703, TML4 704, and TML5 705; rather, control was performed via mobile app 706, PC web browser app 707, and/or UI1 701. All the devices may be be added to mobile app 706, PC web browser app 707, and/or UI1 701 for smart home control. As shown in FIG. 7, the UI/UX for all UI devices 701 and 702a, mobile app 706, and PC web browser app 707 are the same to enable a good user experience. (Display components 701-755 correspond to UI1 701, UI2/TML2 702a,702b, TML3 703, TML4 704, and TML5 704, respectively.) The status of all the devices are synchronized and displayed in mobile app 706, and PC web browser app 707.

Figure 8:
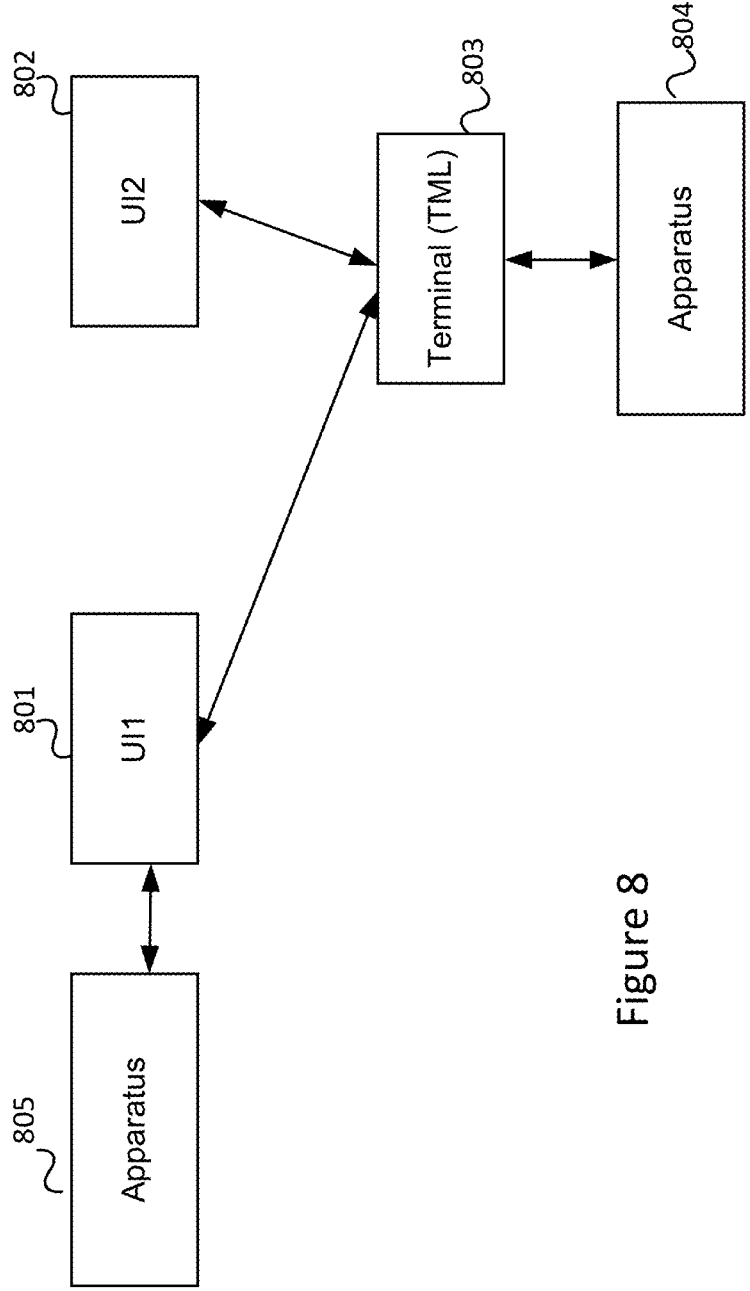
FIGS. 8-12 show exemplary embodiments with one or more UI units and one or more terminal units.

Exemplary embodiments include:

As shown in FIG. 8, a scalable smart control system 800 controls a plurality of controlled apparatuses, where the system comprises:

first and second user-interface (UI) units 801 and 802;

a terminal unit 803 controlling a first controlled apparatus 804;

when the first UI unit 801 receives first information, the first UI unit 801 sends the first information to the terminal unit 803 and controls the first controlled apparatus 804 via the terminal unit 803;

when the second UI unit 802 receives second information, the second UI unit 802 sends the second information to the terminal unit 803 and controls the first controlled apparatus 804 via the terminal unit 803; and when the first UI unit 801 receives third information, the first UI unit 801 directly controls a second controlled apparatus 805.

Figure 9:
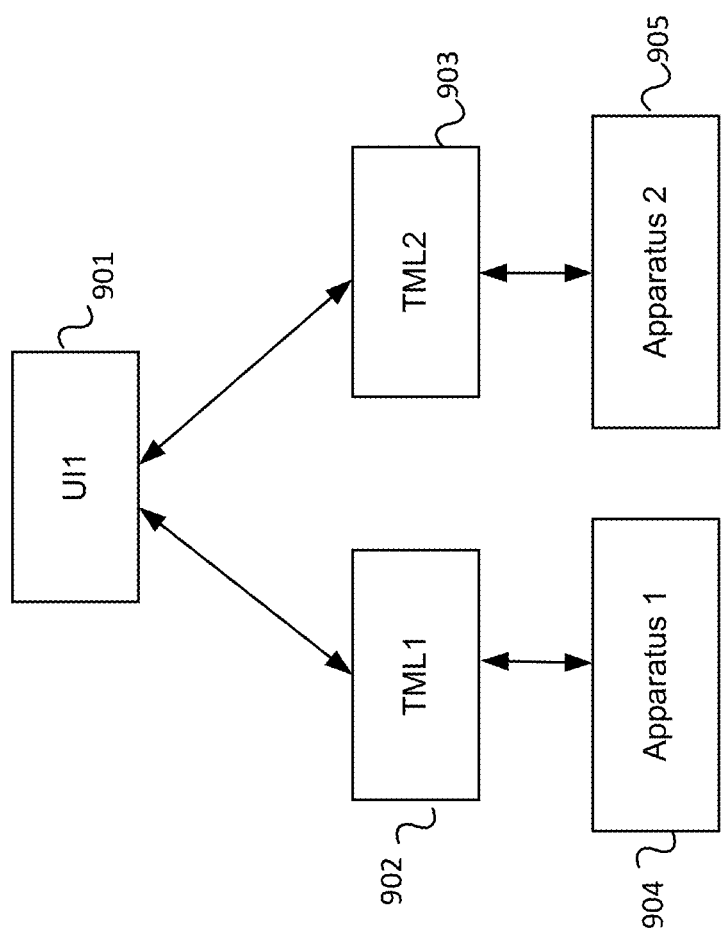

As shown in FIG. 9, a scalable smart control system 900 controls a plurality of controlled apparatuses, where the system comprises:

a user-interface (UI) unit 901;

a first terminal unit 902 controlling a first controlled apparatus 904;

a second terminal unit 903 controlling a second controlled apparatus 905;

the UI unit 901 receiving first target data and second target data;

the UI unit sending the first target data to the first terminal unit 902 and the second target data to the second terminal unit 903;

the first terminal unit 902 controlling the first controlled apparatus 904 in accordance with the first target data; and the second terminal unit 903 controlling the second controlled apparatus 905 in accordance with the second target data.

Figure 10:
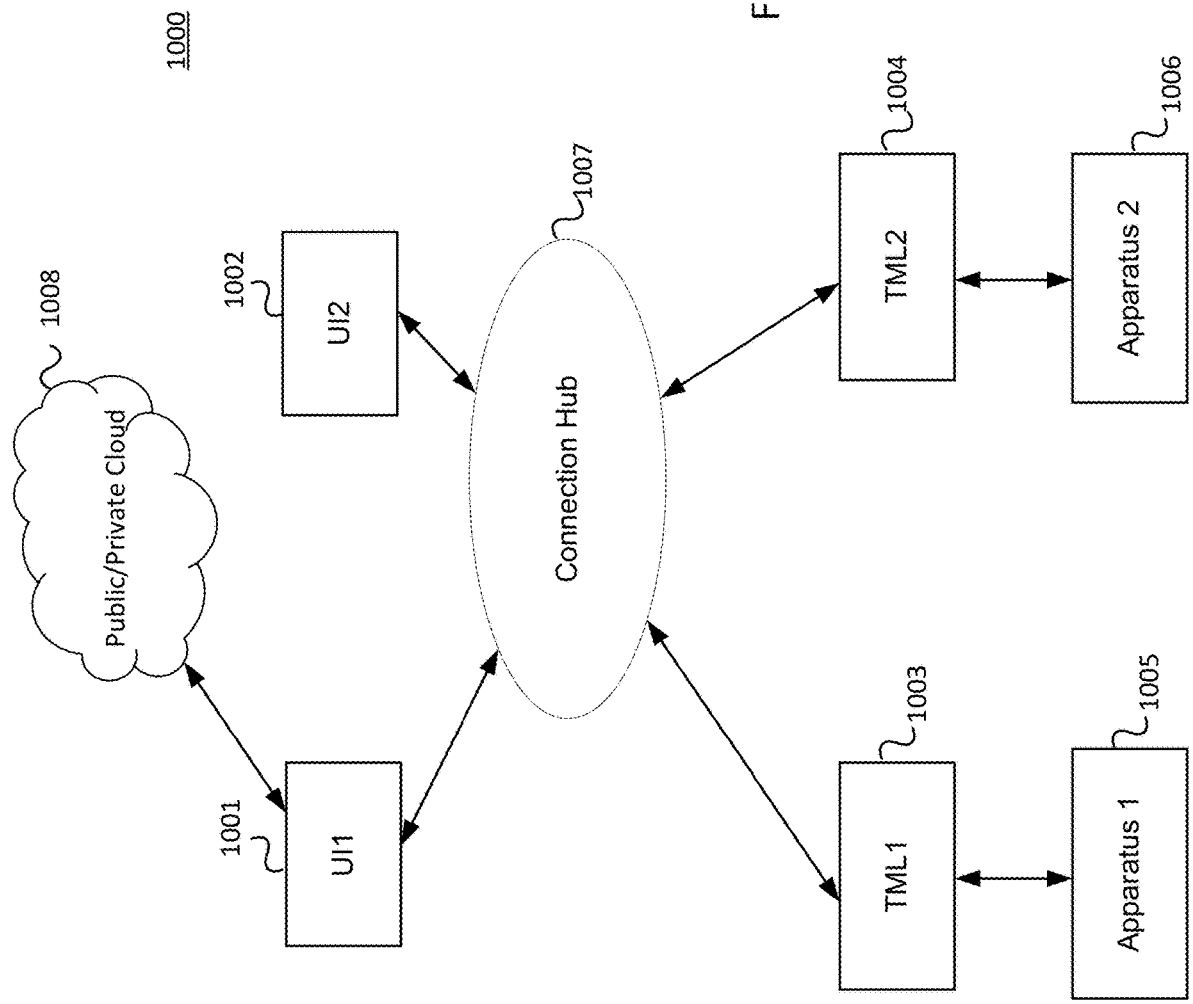

As shown in FIG. 10, a scalable smart control system 1000 controls a plurality of controlled apparatuses, where the system comprises:

first and second user-interface (UI) units 1001 and 1002;

first and second terminal units 1003 and 1004 controlling first and second controlled apparatuses 1005 and 1006, respectively;

a connection hub 1007;

the first UI unit 1001 receiving first control data and sending a subset of the first control data to a cloud computing resource 1008;

the first UI unit 1001 receiving, from the cloud computing resource 1008, a processed subset of the first control data;

the first UI unit 1001 obtaining processed first control data from the processed subset;

the second UI 1002 unit receiving second control data;

the first UI unit 1001 sending the processed first control data and the second UI unit 902 sending the second control data to the connection hub 1007;

the connection hub 1007 collecting and routing the processed first control data and the second control data to the first and second terminal units 1003 and 1004, respectively;

the first terminal unit 1003 controlling the first controlled apparatus 1005 based on the processed first control data; and the second terminal unit 1004 controlling the second controlled apparatus 1006 based on the second control data.

Figure 11:
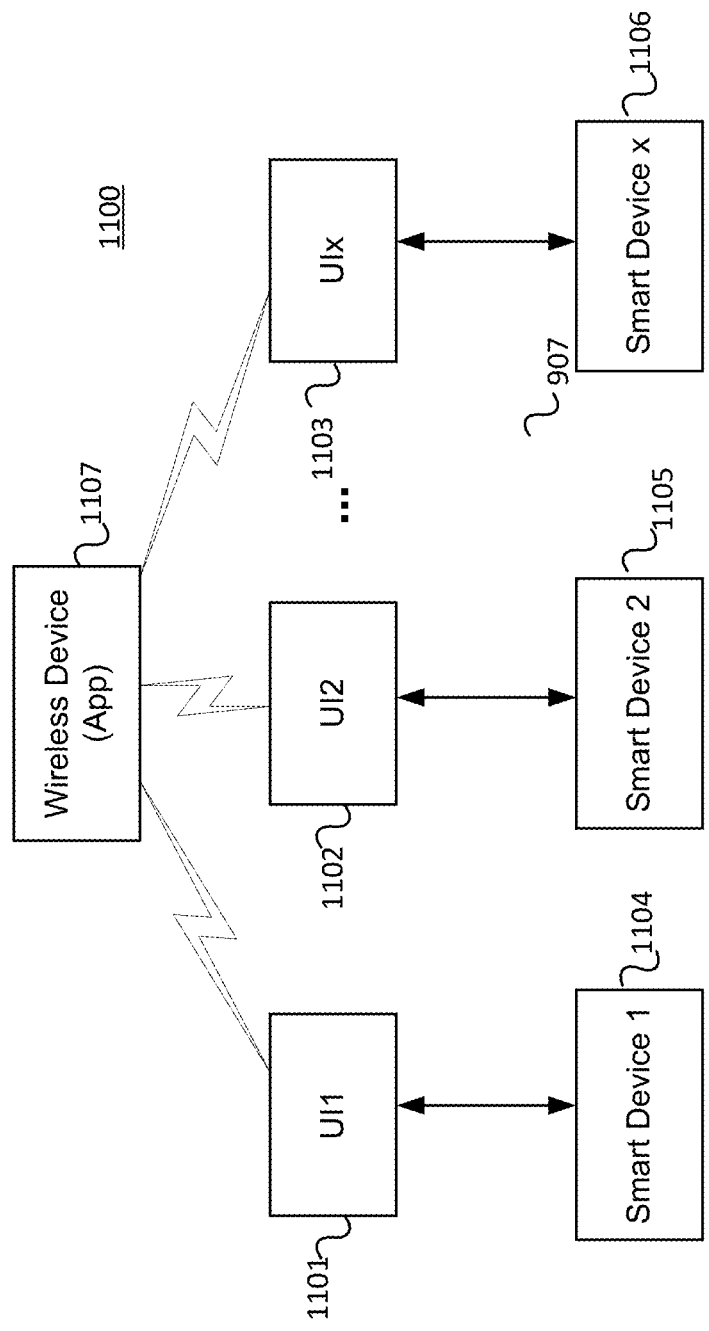

As shown in FIG. 11, a scalable smart control system 1100 controls at least one controlled apparatus, where the control flow and the user interface graphics of a UI unit in a wireless device app 1107 (executed by a wireless device) is identical to that in the physical UI unit 1101, 1102, and 1103. The status of each UI unit in the dash board of the mobile app 1107 is identical to the current status shown in the physical UI unit 1101, 1102, and 1103. A user can choose a UI unit from the dash board of the wireless device app 1107 for further manipulation, as it is done on the spot. This eliminates the learning needs in using the wireless device app 1107 and allows a unified user experience in using the UI unit as well as the wireless device app 1107.

Physical UI unit 1101, 1102, 1103 controls smart devices 1104, 1105, and 1106, respectively, and may do so through terminal units not explicitly shown in FIG. 11.

The wireless device may include a computing device for executing wireless device app 1107. may include a computing device wherein the processes discussed herein may be implemented. The computing device may have a processor for controlling overall operation of the computing device and its associated components, including RAM, ROM, communications module, and memory device. The computing device typically includes a variety of computer readable media. Computer readable media may be any available media that may be accessed by computing device and include both volatile and nonvolatile media, removable and non-removable media. By way of example, and not limitation, computer readable media may comprise a combination of computer storage media and communication media.

Figure 12:
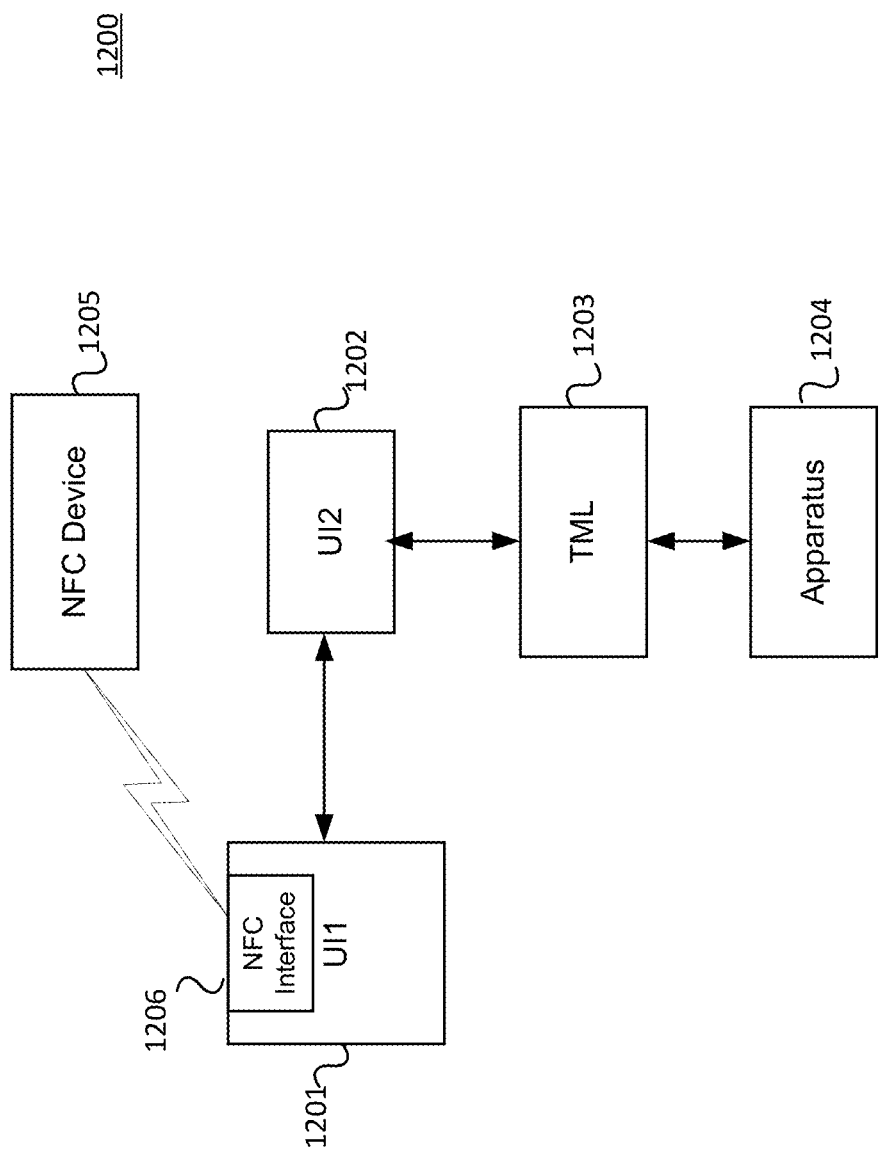

As shown in FIG. 12, a scalable smart control system 1200 controls at least one controlled apparatus, where the system comprises:

first and second user-interface (UI) units 1201 and 1202;

a terminal unit 1203 controlling a controlled apparatus through the second UI unit 1201;

the first UI unit 1201 comprising a near-field communications (NFC) interface 1206;

the first UI unit 1201 receiving configuration data about the controlled apparatus 1204 from a NFC device 1205 through the NFC interface 1206;

the first UI unit 1201 routing the configuration data to the second UI unit 1202;

the second UI unit 1202 sending the configuration data to the terminal unit 1203; and the terminal unit 1203 controlling the controlled apparatus 1204 in accordance with the configuration data.

With another aspect of the embodiments, rules may be automatically generated via machine learning program module. Machine learning may be applied locally in the UI unit of a local loop. Machine learning may also be applied to information received from multiple UI units of a larger network. With some embodiments, the machine learning program module may be executed within a single UI unit that has system hardware with better performance. A machine learning program module may also be distributed over different UI units to reduce the computation loading for individual UI units. The resulting rules determined by the distributed machine learning module may be loaded to the corresponding terminal units to reduce response latency. With some embodiments, the machine learning program module and resulting rules may be executed when the Internet is disconnected.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

As can be appreciated by one skilled in the art, a computer system with an associated computer-readable medium containing computer-executable instructions for controlling the computer system can be utilized to implement the exemplary embodiments that are disclosed herein. The computer system may include at least one computer such as a microprocessor, digital signal processor, and associated peripheral electronic circuitry.

Aspects of the invention have been described in terms of illustrative embodiments thereof. Numerous other embodiments, modifications and variations within the scope and spirit of the disclosed invention will occur to persons of ordinary skill in the art from a review of this entire disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A scalable smart thermostatic control system for controlling a plurality of controlled thermostatic apparatuses, the system comprising:
    first and second user-interface (UI) units;
    a first terminal unit is configured to control a first controlled thermostatic apparatus;
    a second terminal unit is configured to control a third controlled thermostatic apparatus;
    a cloud interface;
    when the first UI unit receives first information, the first UI unit is configured to send the first information to the first terminal unit and to control the first controlled thermostatic apparatus via the first terminal unit;
    when the second UI unit receives second information, the second UI unit is configured to send the second information to the first terminal unit and to control the first controlled thermostatic apparatus via the first terminal unit;
    when the first UI unit receives third information, the first UI unit is configured to directly control a second controlled thermostatic apparatus, wherein the second controlled thermostatic apparatus is different from the first controlled thermostatic apparatus;
    the first UI unit is configured to receive fourth information;
    the first UI unit is configured to send a subset of the fourth information to a cloud computing resource through the cloud interface;
    in response to the sending the subset, the first UI unit is configured to receive, from the cloud computing resource through the cloud interface, a returned processed subset of the fourth information;
    the first UI unit is configured to send the returned processed subset of the fourth information to the second terminal unit; and
    the second terminal unit is configured to control the third controlled thermostatic apparatus from the returned processed subset of the fourth information.

2. The scalable smart control thermostatic system of claim 1, further comprising:
    a connection hub; and
    the connection hub configured to collect the second information and the fourth information from the second and first UI units, respectively, and to route the second information to the first terminal unit and the fourth information to the second terminal unit.

3. The scalable smart control thermostatic system of claim 1, wherein the first controlled thermostatic apparatus comprises a first environmental generator for a first environmental entity and the third controlled thermostatic apparatus comprises a second environmental generator for a second environmental entity.

4. The scalable smart control thermostatic system of claim 3, wherein the first terminal unit supports a different number of heating stages than the second terminal unit for the first and second environmental generators, respectively.

5. The scalable smart control system of claim 1, the system comprising a third UI unit and a third terminal unit, wherein:
    the first UI unit comprises a near-field communications (NFC) interface;
    the first UI unit is configured to receive configuration data about a fourth controlled apparatus from a NFC device through the NFC interface;
    the first UI unit is configured to route the configuration data to the third UI unit;
    the third UI unit is configured to send the configuration data to the third terminal unit; and
    the third terminal unit is configured to control the fourth controlled apparatus in accordance with the configuration data.

6. The scalable smart control thermostatic system of claim 1, the system comprising a fourth UI unit, wherein:
    the fourth UI unit is configured to control a fifth controlled apparatus in accordance with entered data entered to the fourth UI unit;
    the fourth UI unit is configured to inform the first UI unit about the entered data;
    the first UI unit is configured to extract a user profile from the entered data; and
    when the first UI unit detects that the fourth UI unit is not consistent with the extracted user profile, instructing the fourth UI unit to control the fifth controlled apparatus in accordance with the extracted user profile.

7. An apparatus for controlling at least one controlled apparatus, the apparatus comprising:
    a first user-interface (UI) unit comprising a cloud interface;
    a first terminal unit;
    the first terminal unit configured to control a first controlled apparatus;

when the first UI unit receives first information, the first UI unit is configured to send the first information to the first terminal unit and to control the first controlled apparatus via the first terminal unit;

when the first UI unit receives second information, the first UI unit is configured to send the second information to a second UI unit to control a second controlled apparatus via a second terminal unit;

the first UI unit is configured to receive third information;

the first UI unit is configured to send a subset of the third information to a cloud computing resource through the cloud interface;

in response to the sending the subset, the first UI unit is configure to receive, from the cloud computing resource through the cloud interface, a processed subset of the third information; and the first UI unit is configured to send the processed subset of the third information to a third terminal unit to control a third controlled apparatus.

8. The apparatus of claim 7, the first UI unit further comprising a wireless interface, wherein:
the first UI unit is configured to receive fourth and fifth information through the wireless interface;
the first UI unit is configured to route the fourth information to a third UI unit to control a fourth controlled apparatus; and
the first UI unit is configure to route the fifth information to a fourth UI unit to control a fifth controlled apparatus.

9. The apparatus of claim 7, wherein the first terminal unit is configured to receive first control data from a fifth UI unit to control the first controlled apparatus.

10. The apparatus of claim 7, wherein the first UI unit is configured to send second control data to a fourth terminal unit to control a sixth controlled apparatus.

11. The apparatus of claim 10, wherein the first terminal unit and the fourth terminal unit support heating of different environmental entities and support a different number of stages of heating.

12. The apparatus of claim 7, further comprising:
a central UI unit; and
a sixth UI unit, wherein:
the sixth UI unit is configured a seventh controlled apparatus; and
the sixth UI unit is configured to receive entered data;
the sixth UI unit is configured to control the seventh controlled apparatus in accordance with the entered data;
the sixth UI unit is configured to inform the central UI unit about the entered data;
the central UI unit is configured to form a user profile from the entered data, the user profile being indicative of a previous operation of the seventh controlled apparatus; and
when the central UI unit detects that current operation of the seventh controlled apparatus is not consistent with the user profile, instructing the sixth UI unit to control the seventh controlled apparatus in accordance with the user profile.

13. A method for controlling at least one controlled apparatus, the method comprising:
receiving, by a first user-interface (UI) unit, first information;
sending, by the first UI unit, the first information to a first terminal unit to control a first controlled apparatus;
receiving, by the first UI unit, second information;
sending, by the first UI unit, the second information to a second UI unit to control a second controlled apparatus;
receiving, by the first UI unit, third information;
sending, by the first UI unit, a subset of the third information to a cloud resource;
in response to sending the subset, receiving, by the first UI unit, a processed subset of the third information from the cloud resource; and
controlling a third controlled apparatus in accordance with the processed subset of the third information.

14. The method of claim 13, wherein the controlling comprises:
sending, by the first UI interface, the processed subset of the third information to a third UI unit.

15. The method of claim 13, further comprising:
generating, by a mobile app executed by a wireless device, a first control flow and a first user graphics of a first generated user interface to be identical to that in the first UI unit;
manipulating the first generated user interface; and
modifying contents of the first UI unit in accordance with the manipulated first generated user interface.

16. The method of claim 13, further comprising:
receiving, by a fourth UI unit, entered data;
controlling, by the fourth UI unit, a fourth controlled apparatus in accordance with the entered data;
informing a central UI unit by the fourth UI unit about the entered data;
generating, by the central UI unit, a user profile from the entered data, wherein the user profile is indicative of a previous operation of the fourth controlled apparatus;
when the central UI unit detects that current operation of the fourth controlled apparatus is not consistent with the user profile, instructing the fourth UI unit to control the fourth controlled apparatus in accordance with the user profile; and
in response to the instructing, controlling, by the fourth UI unit, the fourth controlled apparatus.

17. A method for controlling at least one controlled thermostatic apparatus, the method comprising:
receiving, by a first user-interface (UI) unit, entered data;
controlling, by the first UI unit, a controlled thermostatic apparatus in accordance with the entered data;
informing a central UI unit by the first UI unit about the entered data;
generating, by the central UI unit, a user profile from the entered data, wherein the user profile is indicative of a previous operation of the controlled thermostatic apparatus;
when the central UI unit detects that current operation of the controlled thermostatic apparatus is not consistent with the user profile, instructing the first UI unit to control the controlled thermostatic apparatus in accordance with the user profile; and
in response to the instructing, controlling, by the first UI unit, the controlled thermostatic apparatus.

* * * * *